June 19, 1923.
P. MUELLER
SERVICE CLAMP
Filed Aug. 2, 1918
1,459,030
3 Sheets-Sheet 2
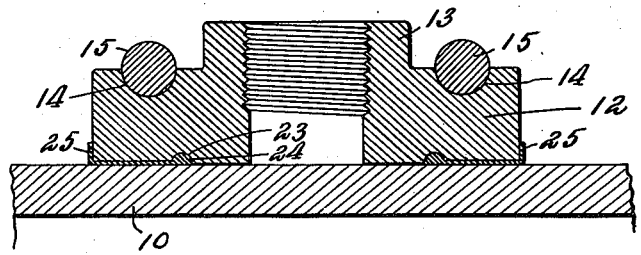
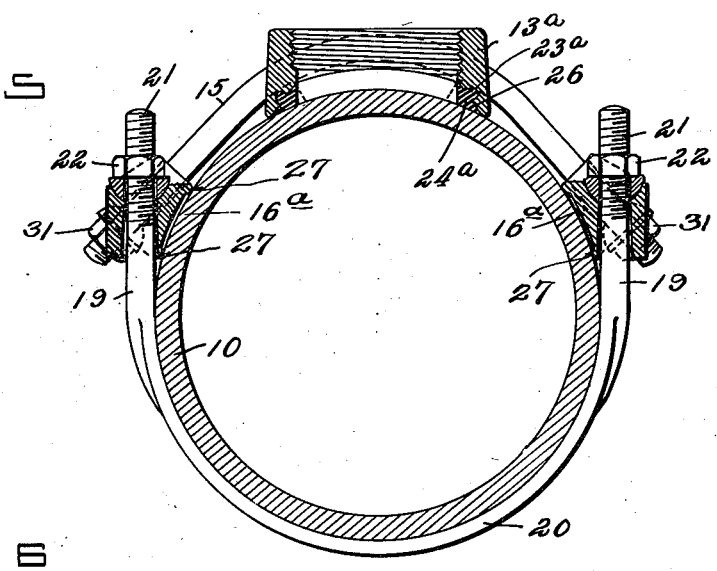
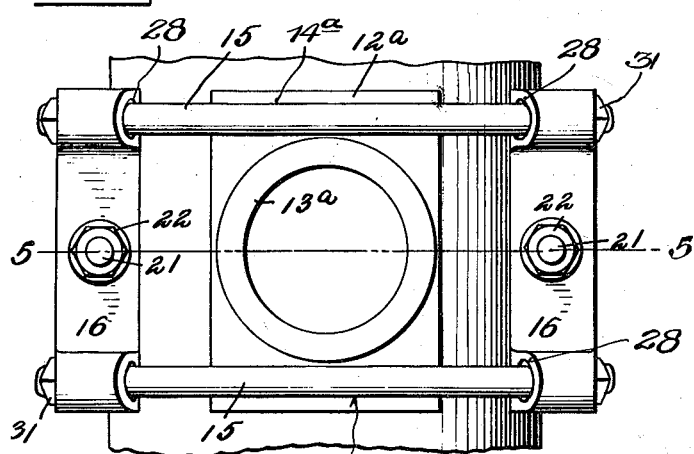
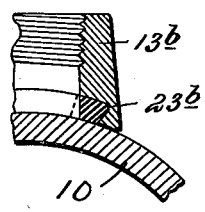
Inventor
Philip Mueller
Witnesses

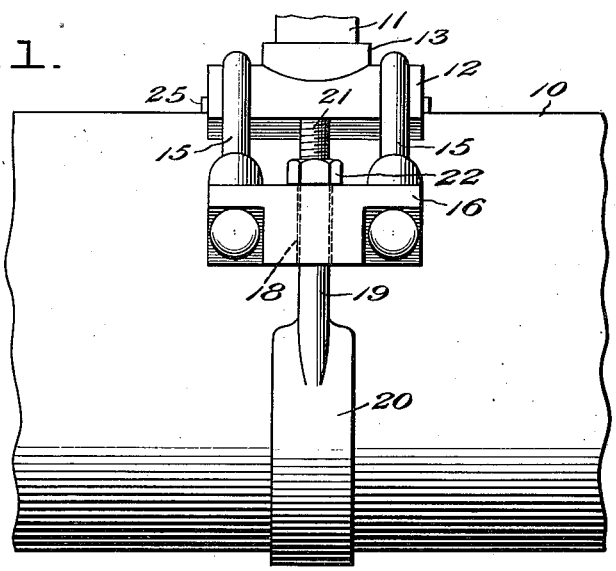
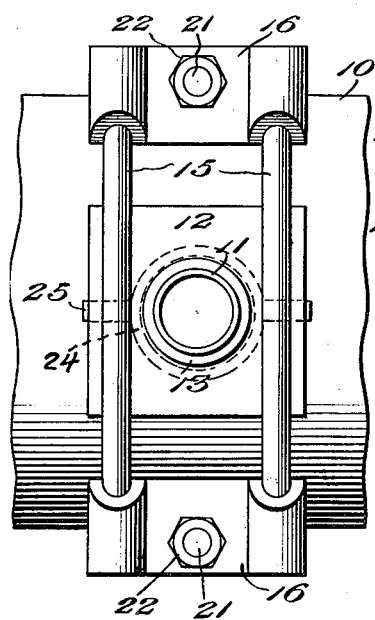
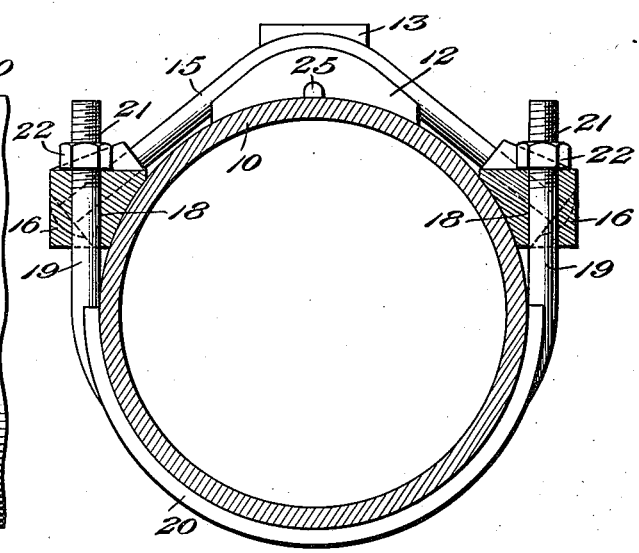

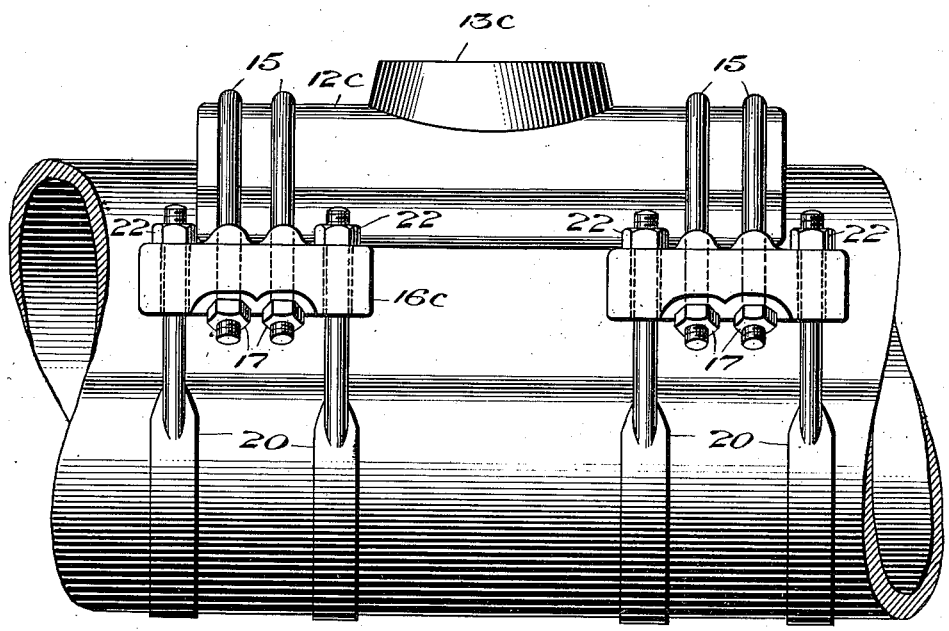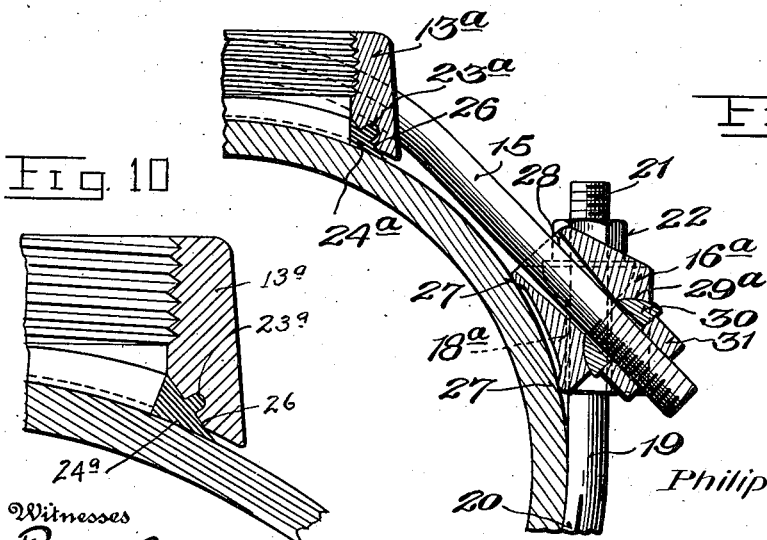

Patented June 19, 1923.

1,459,030

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

SERVICE CLAMP.

Application filed August 2, 1918. Serial No. 248,001.

*To all whom it may concern:*

Be it known that I, PHILIP MUELLER, a citizen of the United States, residing at Decatur, in the county of Macon and State of Illinois, have invented new and useful Improvements in Service Clamps, of which the following is a specification.

This invention relates to service clamps, or to a strengthening device used in tapping service pipes into mains where the mains are not of sufficient thickness or strength to retain the service pipe therein, and where it is necessary to provide a suitable device for holding the service pipe in proper position upon the main, and for sealing the connection between the main and the service pipe.

It has been the practice (as illustrated by the structure shown in United States Letters Patent No. 852,682, to A. C. Schuermann, dated May 7, 1907,) to provide the saddle of the service clamps with integral arms which extend outwardly a sufficient distance to receive the ends of the clamping strap, and while this type of service clamp is satisfactory for mains of small sizes, it is objectionable in cases where it is desired to make a service connection to mains of relatively large diameter, in that the weight of the service clamp increases out of proportion to the increase in size of the main, and in larger sizes the clamps are extremely heavy, and the cost of freighting the same is relatively high. Furthermore, when the arms are made integral with the saddle, it is necessary to construct the service clamp of malleable iron in order that the integral arms may be strong enough to resist the strains to which they are subjected, and the process of making malleable articles requires extensive facilities and a considerable length of time.

It is the purpose of the present invention to provide a structure which is not open to the objections above noted, and to this end I provide an improved service clamp wherein the saddle plate is connected to the clamping straps by clamping bars independent of and separate from the saddle plate, the ends of the clamping bars and straps being secured to suitable tying members herein referred to as the "bridges."

A service clamp constructed in accordance with the present invention is of skeleton form, so that it is relatively light in weight even in the larger sizes, and the cost of freighting the same is comparatively low. The saddle and bridges of the clamp will be sufficiently strong to resist strains to which they are subjected if made of cast iron, and as cast iron articles may be made more easily, cheaply, and quickly than malleable iron objects, orders can be filled almost immediately after they are filed.

Further objects of the present invention are to provide an improved service clamp, wherein a greater radius of adjustment may be had than in prior devices; wherein the clamp may be more securely fixed upon the main; wherein the major portions of the clamp may be used upon pipes varying in size; and wherein an easily operated clamp is produced economically, occupies but relatively small space, and requires but a small space about the main for its assembly, removal, or adjustment.

Another feature of the invention is the disposition of the packing-receiving recess and packing, whereby calking of the joint may be readily and effectively done, and a fluid-tight joint secured.

The above and other objects and advantages of this invention will be more fully set forth in the following detail description of the present embodiment of the invention, in connection with the accompanying drawings, wherein:—

Figure 1 is a side elevation of the improved clamp applied to a main.

Figure 2 is a transverse section through the main showing one edge of the clamp.

Figure 3 is a top plan view of the clamp applied to a main.

Figure 4 is a longitudinal central section taken through the clamp and the main.

Figure 5 is a transverse section taken on line 5—5 of Figure 6, through a main having a slightly modified form of the clamp and packing applied thereto.

Figure 6 is a top plan view thereof.

Figure 7 is a view similar to Figure 5 but illustrates a fragment of the structure on an enlarged scale.

Figure 8 is a fragmentary sectional view through a saddle plate showing a further modified form of packing.

Figure 9 is a side elevational view of a slightly different construction of service clamp.

Figure 10 is a fragmentary sectional view on an enlarged scale of the packing shown in Figure 5 but before calking the packing into its final form.

Referring to these drawings, wherein like parts are designated by similar characters of reference throughout the several views, 10 designates a main or pipe, through which water or the like is adapted to course, and 11 designates a service pipe for adjustment to the main.

The service clamp illustrated in Figures 1 to 4 inclusive, comprises a saddle plate 12 having an inner surface conforming substantially to the outer contour of the main 10, and having at its middle portion an outstanding or radiating boss or extension 13 suitably tapped and threaded for the reception of the service pipe 11, corporation cock, or the like, which is to be attached to the main.

At either side of the boss or extension 13, the saddle plate 12 is provided with grooves 14, the same being, preferably, semi-circular in cross-section and adapted to receive a pair of clamping rods 15. The rods 15 extend partially around the main and terminate at the opposite sides thereof in bridges 16 to which the rods are secured in any suitable manner, as by means of riveting, as shown in Figures 1 and 2.

Each bridge 16 is provided with a central opening 18 through which projects the adjacent rounded end 19 of a strap 20, the latter passing around the other portion of the main. The rounded ends 19 of the strap 20 are threaded, as at 21, for the reception of binding nuts 22 which work against the upper faces of the bridges 16.

The saddle plate 12 is provided in its lower or bearing surface with an annular groove or recess 23, into which is fitted a suitable packing 24, as of lead. As shown in Figure 4, the packing 24 may be retained in place, or in registry with the groove 23, by means of projections or lugs 25 extending radially from the packing ring 24 and being bent up about the edges of the saddle plate 12 to retain the packing from accidental displacement.

It is, of course, understood that the clamp may be provided with saddle plates of various sizes so as to provide bosses or extensions of various sizes to accommodate service pipes, and other members, of various sizes, for adjustment to the main.

It will be observed that the bridge pieces 16 are so disposed relative to the clamping rods 15 and the straps 20 in Figure 9 as to give a straight pull on the rods and straps when the ends are set up to hold the clamp in place. This arrangement has this advantage that no lateral strain is exerted on the rods or straps to cause bending or distortion thereof, as would be the case if the strains were distributed other than in the straight lines shown.

In the application and adjustment of the service clamp shown in Figures 1 to 4, inclusive, it is only necessary to cleanse the outer surface of the main 10 to be tapped; apply the saddle plate 12 with its packing 24 to that part of the main 10; place the clamping rods 15 across the saddle plate 12 in the grooves 14; insert the reduced ends 19 of the strap 20 through the openings 18 in the bridges 16; and apply and tighten the clamping nuts 22 against the bridges 16. This latter operation draws the clamping rods 15 down upon the saddle plate 12 and binds the latter against the side of the main 10. It is thus seen that the service clamp constitutes practically a part of the main, and securely holds the service pipe 11, or other device, in correct position for communication with the main. When the saddle plate 12 is forced against the main 10, the packing 24 is compressed between the main and the saddle plate is flattened and provides a sealed joint therebetween.

Referring now to that embodiment of my invention shown in Figures 5, 6 and 7, the boss or extension 13$^a$ may be relatively large, and is flared at its end to form a beveled inner lower edge 26 facing the outer surface of the main 10. The said beveled edge has an outwardly extending annular groove 23$^a$ or recess therein adapted to receive a suitable packing 24$^a$, as of lead; the packing fitted in said recess at substantially right angles to the beveled edge. The recess or groove 23$^a$ has a circumferentially disposed interstice or recess at its inner angle which receives and retains the packing against the bevel edge 26 during the application of the saddle plate 12$^a$ to the main. When the saddle plate 12$^a$ is in position, the lead packing 24$^a$ assumes the form shown in Figure 10, and may be calked or flattened and forced into the position shown in full lines in Figure 5 by any suitable calking tool so as to insure a fluid tight joint between the main and the saddle plate.

The inner projecting section of the packing 24$^a$, which is interlocked in the groove 23$^a$ is preferably formed with its sides substantially parallel. Thus, it will be seen that by reason of the inclined position of the recess 23$^a$ and the edge 26 of the boss 13$^a$, means are provided for maintaining the packing 24$^a$ in a secure and tight position within the recess 23$^a$ without the necessity of employing any additional retaining means, since the possibility of the packing becoming dislodged either vertically or laterally is positively eliminated by the inclined position it assumes when the installation is set up.

In Figure 5 of the drawings the inner face of the saddle plate conforms to the outer face of the main or pipe, but the same saddle and packing may be used on mains of slightly different diameters. In Figure 7, the radius of curvature of the concave face of the saddle plate is greater than the diameter of the main so that only the central longitudinal portion of the saddle engages the main, and there is a slight clearance at the side edges of the saddle. If the radius of the main is greater than the curvature of the saddle, the saddle, at its longitudinal edges, would engage the main, and there would be a clearance at the center. In either case the slight clearance would not prevent the packing from forming a tight seal.

In this embodiment (Figures 5, 6 and 7) the bridges 16ª are of such construction, and the clamping bars and strap are secured in such a manner that a greater range of adjustment to mains of various sizes may be had than with the structure shown in the preceding embodiment. Each of the bridges 16ª has, along each longitudinal edge of its face opposed to the main, a rib 27, and these ribs form, between the main and each bridge, two lines of contact. As only the longitudinal edges of bridge 16ª engage a main, the bridge will solidly fit against mains of different diameters.

When the parts are used on mains of slightly different diameters, the angles between the ends of the rods 15 and the straps 20 will change, and to allow of the proper angular adjustment, the openings 28 of the bridges 16ª through which the bars 15 pass, are tapered; these openings 28 terminate at their lower ends in sockets 29, which receive ball washers 30 against which nuts 31, threaded on the ends of the rods 15, work; and the openings 18ª are of greater diameter than the ends of the strap 20 which they receive.

To apply the service clamp shown in Figures 5, 6 and 7, it is only necessary to place the saddle plate 12ª with its packing 24ª, upon that part of the main 10 to be tapped, and which has been cleansed; insert the ends of the clamping rods 15 through the openings 28 in the ends of the bridges; slip the ball washers 30, and screw the nuts 31 onto the ends of the rods 15; place the clamping rods 15 across the saddle plate 12ª in the grooves 14ª; screw the nuts 22 onto the ends 19 of the strap 20; then finally adjust the bridges 16ª to proper position by means of the nuts 31; and then firmly tighten the nuts 22 against the bridges 16ª to draw the rods 15 against the saddle plate 12ª.

Figure 8 shows a further modification of the packing wherein the lower end of the boss or extension 13ᵇ has in its inner wall an undercut recess or groove 23ᵇ, the lower side of which is inclined inwardly and downwardly and terminates in the bearing surface of the saddle plate. This recess receives a lead or other packing and retains the same in place during the tightening of the saddle plate upon the main. This packing is first of the shape shown in dotted lines in Figure 8, and when the saddle plate is tightened is adapted to be calked between the main and saddle plate to provide a sealed joint therebetween.

In the embodiment shown in Figure 9, the saddle plate 12ᶜ is similar to those shown in the preceding figures except that it may be longer and it has two grooves 14 at each side of the central boss or extension 13ᶜ. The means for securing the opposite ends of the saddle plate 12ᶜ to the main are independent of each other, and each of these means comprises a pair of clamping rods 15 engaging in the pair of grooves 14 at one end of the saddle plate, a pair of bridges 16ᶜ to which the opposite ends of the rods 15 are secured by means of nuts 17, and a pair of straps 20 having their opposite ends passing through openings in the bridges 16ᶜ and secured against withdrawal therefrom by nuts 22. The construction shown in Figure 9 is particularly adapted for use on mains of large diameters and tappings, for, as each of the clamps has two rods 15 and two straps 20, the clamps are of great strength and will securely hold the saddle plate in place and reinforce the main.

It is, of course, understood that the saddle plate 12, bridge pieces 16, and the other parts of this clamp may be of various shapes and proportions to accommodate the device to the various conditions of usage, and that such changes or modifications, limited only by the scope of the following claims, are contemplated in the spirit of this invention.

What is claimed is:

1. A service clamp comprising a saddle plate, clamping bars having curved plate-engaging portions and straight end portions, bridge pieces joining opposite ends of said bars, a strap having a curved central portion engaging the main and straight ends passing through said bridge pieces, and clamping nuts to contract said strap and bars.

2. A service clamp comprising a saddle plate, clamping bars having curved plate-engaging portions and straight end portions, a strap having a curved central portion engaging the main and straight ends lying adjacent the opposite ends of said bars, and bridge pieces joining the opposite ends of said bars and strap and of such construction as to permit lateral movement of the ends of said bars and strap relative to each other.

3. A service clamp comprising a saddle plate, clamping bars having curved plate-engaging portions and straight end portions, a strap having a curved central portion engaging the main and straight ends lying adjacent the ends of said bars, bridge pieces connecting the ends of said bars and strap and laterally adjustable relative thereto, and clamping nuts to contract said strap and bars.

4. A service clamp comprising a saddle plate, clamping bars having curved plate-engaging portions and straight end portions, a strap having a curved central portion engaging the main and straight ends adjacent the ends of said bars, a bridge piece to receive the ends of the bars and strap having enlarged openings to permit lateral play, and clamping nuts to contract said strap and bars.

5. A service clamp comprising a saddle plate, clamping bars engaging said plate, a strap engaging the main and having its ends arranged adjacent the ends of said bars, a bridge piece having tapering openings connecting the ends of said bars and strap, a rocking connection between the ends of said bars and said bridge piece, and clamping nuts to contract said strap and bars.

6. A service clamp comprising a saddle plate, clamping bars engaging said plate, a strap engaging the main, bridge pieces having tapering openings therethrough to receive and permit lateral play of said bars and strap, a bar-engaging member having rocking engagement with said bridge pieces, and clamping nuts to contract said strap and bars.

7. A service clamp comprising a saddle plate having a pipe-receiving aperture therein and a packing-receiving recess about said aperture, a packing in said recess projecting normally beyond the pipe engaging surface of said saddle plate and inwardly of said pipe-receiving aperture, and contractible clamping means to clamp said plate and projecting packing against the main to form a sealed joint.

8. A bridge-piece for service clamps having a curved main-engaging face and separated longitudinally disposed main-engaging ribs on said curved face.

9. A bridge-piece for service clamps having a main-engaging face and ribs running lengthwise of the main at its opposite edges to make a two-point contact with said main.

10. A saddle plate for service clamps having a pipe-receiving aperture therethrough and a packing-receiving recess surrounding said aperture, and a packing in said recess extending below the main-engaging face of said plate and inwardly beyond the wall of said pipe-receiving aperture.

11. A saddle plate for service clamps having a pipe-receiving aperture therethrough and a packing-receiving recess surrounding said aperture, a packing permanently interlocked in said recess and projecting beyond the main-engaging wall of said plate and inwardly beyond the wall of said pipe-receiving aperture.

12. A saddle plate for service clamps having a pipe-receiving aperture therethrough and a packing receiving recess surrounding said aperture, a packing in said recess extending below the main engaging face of said plate, and having a portion normally projecting beyond the wall of said pipe receiving aperture, said projecting portion adapted to be calked substantially flush with the wall of the pipe receiving aperture when the parts are set up.

13. A service clamp comprising a saddle plate, clamping bars engaging over said saddle plate, a strap, bridges having enlarged openings for loosely receiving the ends of said bars and said strap to permit angular adjustment therebetween, rocking washers on the ends of said bars, and securing members mounted upon the ends of said straps and bars for engagement against said bridges to contract said strap and said bars upon the saddle plate.

14. A service clamp comprising a saddle plate, clamping bars engaging over said saddle plate and having threaded ends, a strap having threaded ends, bridges having enlarged openings for loosely receiving the ends of the bars and the strap to permit angular adjustment therebetween, rocking washers on the ends of said bars, and clamping nuts mounted upon the threaded ends of said strap and bars for engagement against the bridges to contract said strap and said bars upon the saddle plate.

15. A service clamp comprising a saddle plate, clamping bars engaging over the saddle plate and having threaded ends, a strap having threaded ends, bridges having tapering openings which terminate in sockets and which loosely receive the threaded ends of said bars, said bridges also having enlarged openings for loosely receiving the ends of said strap, ball washers in said sockets, and nuts carried by said bars and engaging against said washers.

16. A saddle plate for service clamps, having an aperture therethrough flared at its end to form a bevelled packing seat thereon, a locking interstice formed in said bevelled seat, and a packing member on said seat having a section provided with substantially parallel sides adapted to be interlocked with said interstice to prevent accidental displacement of said packing.

17. A saddle plate for service clamps, having an aperture therethrough flared at its end to form a bevelled packing seat thereon, a locking interstice formed in said bevelled seat, and a packing member on said seat having a section substantially at right angles to said seat provided with substantially parallel sides adapted to be interlocked with said interstice to prevent accidental displacement of said packing.

18. A saddle plate for service clamps, having an aperture therethrough flared at its end to form a bevelled packing seat thereon, a continuous annular locking interstice formed in said bevelled seat, and a packing member having its side and end faces exposed and having a section substantially at right angles to said seat provided with substantially parallel sides adapted to be interlocked with said interstice to prevent accidental displacement of said packing.

19. A saddle plate for service clamps having a pipe receiving aperture therethrough, a packing receiving seat surrounding said aperture, and a packing on said seat having a calking section extending beyond the wall of said receiving aperture.

20. A saddle plate for service clamps having a pipe receiving aperture therethrough, a packing receiving seat surrounding said aperture and having a recess formed in its wall, and a packing on said seat having a section interlocked with said seat recess and provided with a calking section extending inwardly beyond the wall of said pipe receiving aperture.

21. A saddle-plate for service clamps having an aperture therethrough and a packing receiving recess surrounding said aperture, and a packing in said recess having a calking section extending inwardly beyond the wall of said aperture, said calking section adapted to be made substantially flush with the wall of the aperture when the parts are set up.

22. A saddle-plate for service clamps having an aperture therethrough, and a packing carried by said plate and having a calking section extending inwardly beyond the wall of said aperture, said calking section adapted to be made substantially flush with the wall of the aperture when the parts are set up.

In testimony whereof I have hereunto set my hand.

PHILIP MUELLER.